United States Patent
Kawakami

(10) Patent No.: US 6,433,884 B1
(45) Date of Patent: *Aug. 13, 2002

(54) APPARATUS FOR DETERMINING PRIORITY OF PRINT JOBS IN A PRINTER SYSTEM

(75) Inventor: Hiroshige Kawakami, Yokohama (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/861,905

(22) Filed: May 22, 1997

Related U.S. Application Data

(63) Continuation of application No. 08/328,873, filed on Oct. 25, 1994, now abandoned.

(30) Foreign Application Priority Data

Oct. 29, 1993 (JP) ............................................. 5-272743

(51) Int. Cl.⁷ ............................................. G06K 15/00
(52) U.S. Cl. ........................................ 358/1.15; 358/1.6
(58) Field of Search ................................. 395/101, 106, 395/111, 112, 114, 115, 672, 673, 570; 358/403, 409, 412, 437, 1.1, 1.6, 1.12, 1.13, 1.15, 1.16; 709/102, 103; 712/229

(56) References Cited

U.S. PATENT DOCUMENTS

| | | | |
|---|---|---|---|
| 5,075,874 A | * 12/1991 | Steeves et al. | 395/112 |
| 5,131,078 A | * 7/1992 | Ikenoue | 395/114 |
| 5,200,830 A | * 4/1993 | Imaizumi et al. | 358/296 |
| 5,287,434 A | * 2/1994 | Bain et al. | 395/101 |
| 5,293,466 A | * 3/1994 | Bringmann | 395/114 |
| 5,299,296 A | * 3/1994 | Padalino et al. | 395/112 |
| 5,303,336 A | * 4/1994 | Kayeyama et al. | 395/114 |
| 5,327,526 A | * 7/1994 | Nomura et al. | 395/115 |
| 5,332,320 A | * 7/1994 | Ohara | 395/112 |
| 5,475,801 A | * 12/1995 | Brindle et al. | 395/114 |
| 5,487,170 A | * 1/1996 | Bass et al. | 395/732 |
| 5,933,580 A | * 8/1999 | Uda et al. | 358/1.13 |

FOREIGN PATENT DOCUMENTS

EP 0469882 A2 * 2/1992

* cited by examiner

Primary Examiner—Gabriel Garcia
(74) Attorney, Agent, or Firm—Cooper & Dunham LLP

(57) ABSTRACT

A print priority determining apparatus includes a recognizing unit for reading a print condition of each of a plurality of print job files from a memory, a reading unit for reading a current setting parameter of a printer from the memory, a comparison unit for detecting whether the print condition read by the recognizing unit is in accordance with the setting parameter read by the reading unit, and a priority setting unit for determining a priority of each of the print job files in accordance with a result of the detection by the comparison unit.

19 Claims, 5 Drawing Sheets

APPARATUS FOR DETERMINING PRIORITY OF PRINT JOBS IN A PRINTER SYSTEM

This is a continuation of application Ser. No. 08/328,873 filed Oct. 25, 1994, now abandoned.

BACKGROUND OF THE INVENTION

The present invention generally relates to a printer system, and more particularly to a printer system which manages the sequence of print jobs of a plurality of documents on a queue for a printer shared by a group of host computers on a network.

In a network on which a group of host computers are connected, one of the host computers serves as a file server dedicated to storing a number of documents or print job files from the other host computers, and a printer, connected to the file server, is shared by the host computers on the network. The print job files, stored in a memory within the network, are waiting to be printed by the printer. Another term for placing a number of documents on a queue is print spooling.

In order to print the number of documents from the host computers, an operating system lines up the documents in a buffer. This buffer is called a queue. The operating system pulls the documents off the queue one at a time and transmits that document to the printer, so that each of the documents is printed by the printer.

The order in which a system executes print jobs on the queue depends on a print priority scheme being used. Most commonly, print jobs are executed in the same order that they were placed on the queue.

However, when it takes several minutes to print out a document from a certain host computer, the other host computers have to wait for the printing of the subsequent documents on the queue to be started. There is a problem in that the printing of the subsequent documents from the other host computers is not started unless the printer has completed the printing of that document.

In another case, an error of the printer may take place, and a print job of a certain document from one workstation is being held up during the error of the printer. Under this circumstance, the other host computers have to wait for several minutes for the printer to start the printing of the documents sent from those host computers because the printer is in a waiting condition unless the error of the printer is eliminated. In addition, the printer may malfunction in the course of the printing of a number of documents on the queue, and a print job for a certain document on the queue is stopped during the malfunction.

On the other hand, the file server on the network has a function to cancel the entry of a print job file from the queue. Generally, when any error on the printer occurs, a supervisor who manages the network resources can use such a function in order to speed up the printing of the subsequent print job files. However, the other users at the host computers cannot use the function mentioned above and do not deal with the print job files on the queue.

SUMMARY OF THE INVENTION

Accordingly, it is a general object of the present invention to provide a novel and useful print priority determining apparatus in which the aforementioned problem is eliminated.

Another, more specific object of the present invention is to provide a print priority determining apparatus which allows a printer system to efficiently carry out print jobs for a group of host computers on a network, by determining a priority of each of print job files in accordance with predetermined schemes.

The above mentioned object of the present invention is realized by a print priority determining apparatus which includes a recognizing unit for reading a print condition of each of a plurality of print job files from a memory, a reading unit for reading a current setting parameter of a printer from the memory, a comparison unit for detecting whether the print condition read by the recognizing unit is in accordance with the setting parameter read by the reading unit, and a priority setting unit for determining a priority of each of the print job files in accordance with a result of the detection by the comparison unit.

According to the present invention, the priority of each of the print job files is determined and the sequence of print jobs being executed is arranged in a desired manner, rather than a first-in first-out sequence. The print priority determining apparatus enables the printer system to efficiently carry out print jobs for a group of host computers on the network without the need to await for several minutes an end of execution of a certain print job.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

A description will now be given of a printer system to which an embodiment of the present invention is applied, with reference to FIG. 1.

Figure 1:
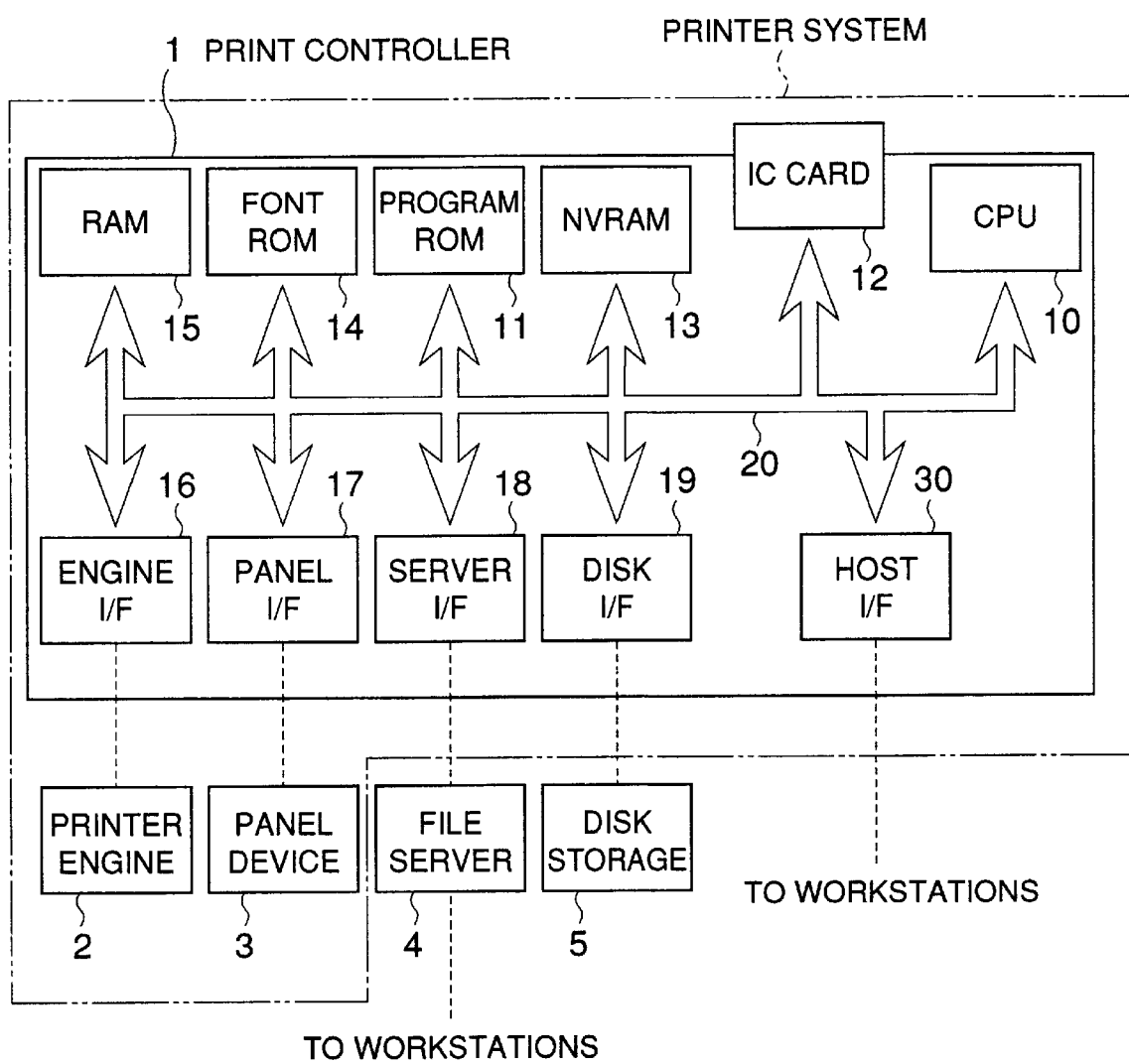
FIG. 1 is a system block diagram of a printer system to which an embodiment of the present invention is applied.

In FIG. 1, a printer system includes a print controller 1, a printer engine 2, and a panel device 3. The print controller 1 comprises an image processing unit which processes character data and image data to generate an image. The printer engine 2 comprises an image forming unit which prints an image, supplied from the print controller 1, on a recording medium such as recording paper.

The printer engine 2 includes an electrically erasable programmable read-only memory (EEPROM) or a flash EEPROM. An EEPROM can be erased by exposing it to an electrical charge, and it retains its contents even when the power is turned off. A flash EEPROM is a special type of EEPROM, and it can be rewritten while it is in the computer rather than requiring a special device called a PROM reader.

The panel device 3 is an operations/display part for the print controller 1 and the printer engine 2, and it is used to set various functions such as a mode selection and a download instruction and to display operational information on the panel device 3.

In FIG. 1, there are provided a file server 4 and a disk storage unit 5. The file server 4 is a computer and storage device dedicated to storing files from a plurality of host computers on the network and transmitting the files. The disk storage unit 5 is a hard disk unit or a floppy disk unit dedicated to storing various kinds of data, including font data, download program data, and print data.

In FIG. 1, the print controller 1 includes various component units which are interconnected by a system bus 20. A central processing unit (CPU) 10 controls operations of the component units of the print controller 1. A program ROM 11 is an electrically erasable programmable read-only memory in which a control program for the print controller 1 is stored. The CPU 10 operates the component units of the print controller 1 in accordance with the control program stored in the program ROM 11, in accordance with the mode selection set on the panel device 3, and in accordance with an instruction from the file server 4. An IC (integrated circuit) card 12 is attached to the print controller 1, and provides font data, download program or download data from the external. A non-volatile random access memory (NVRAM) 13 is for storing mode selection data and download instructions from the panel device 3. A font ROM 14 is an electrically erasable programmable read-only memory in which font pattern data is stored. A RAM 15 is a random access memory which provides a work memory for the CPU 10, an input buffer for storing input data, a page buffer for storing print data, and a buffer for storing download font data.

In FIG. 1, the print controller 1 further includes various interface circuits which are interconnected by the system bus 20. An engine interface (ENGINE I/F) 16 is for communicating with the printer engine 2 to receive commands, status, print data, and download data from the printer engine 2. A panel interface (PANEL I/F) 17 comprises an electrically erasable read-only memory, and is for communicating with the panel device 3 to receive commands, status data and download data. A file server interface (SERVER I/F) 18 is for communicating with the file server 4. The interface of the SERVER I/F 18 is in accordance with the Centronics interface or the RS-232C interface. A disk interface (DISK I/F) 19 is for communicating with the disk storage unit 5.

In FIG. 1, the print controller 1 further includes a host interface (HOST I/F) 30 which is for communicating with a plurality of host computers on the network to which the printer system in FIG. 1 is connected.

Next, a description will be given of a print priority determining apparatus in an embodiment of the present invention, with reference to FIGS. 2 through 4. The print priority determining apparatus in this embodiment is applied to the printer system shown in FIG. 1. However, it should be noted that the apparatus according to the present invention is not limited to this embodiment and it is also applicable to a workstation or a file server on a network.

Figure 2:
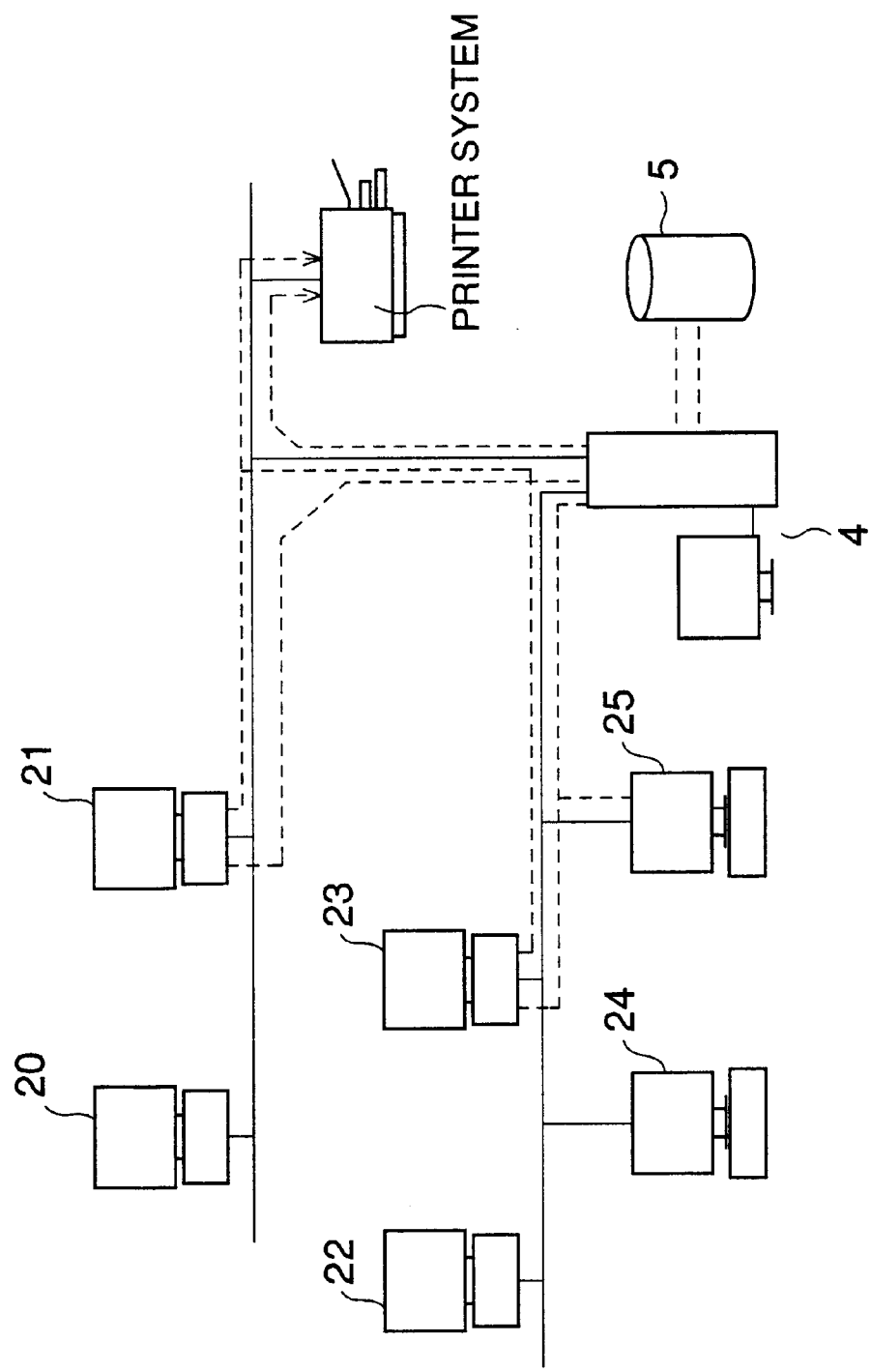
FIG. 2 is a diagram showing a group of host computers on a network to which the printer system in FIG. 1 is connected.

FIG. 2 shows a group of host computers on a network to which the printer system in FIG. 1 is connected. In FIG. 2, host computers 20 through 23 are workstations for clients operated by an operating system, and host computers 24 and 25 are workstations for clients operated by another operating system. The printer system, the file server 4, and the disk storage unit 5, shown in FIG. 1, are also connected to the network.

The file server 4 receives a number of documents from the host computers 20 through 25 on the network, and stores the documents as print data so that the respective print data of the documents are placed on the queue. The printer system receives the print data (one document) from the file server 4 via the server I/F 18, and, at the same time, the printer system receives print commands, relating to the print jobs of the documents, from the host computers 20 through 25 via the host I/F 30. Most commonly, the print data (one document) is temporarily stored in the RAM 15 of the print controller 1, and subjected to a printing procedure by the printer engine 2. Exceptionally, when the quantity of the print data is very large, the print data is stored in the disk storage unit 5 instead of the RAM 15.

The printer system uses various setting parameters, stored in the RAM 15 as the internal parameters of the printer system, so that a print job of each of the documents on the queue is carried out in accordance with the setting parameters. The setting parameters of the printer system include an emulation code, a paper size code, an input tray code, an output tray code, a download font code, a macro code, a bit map font data code, an outline font data code, and a number-of-copies code. The setting parameters further include a color print code, a resolution code, a paper-end error code, and a duel-print code. These parameters are received from the printer engine 2 to the print controller 1 by communicating with the printer engine 2 via the engine I/F 16.

Thus, the printer system can read each of the setting parameters which are currently valid to carry out the printing procedure.

Figure 3:
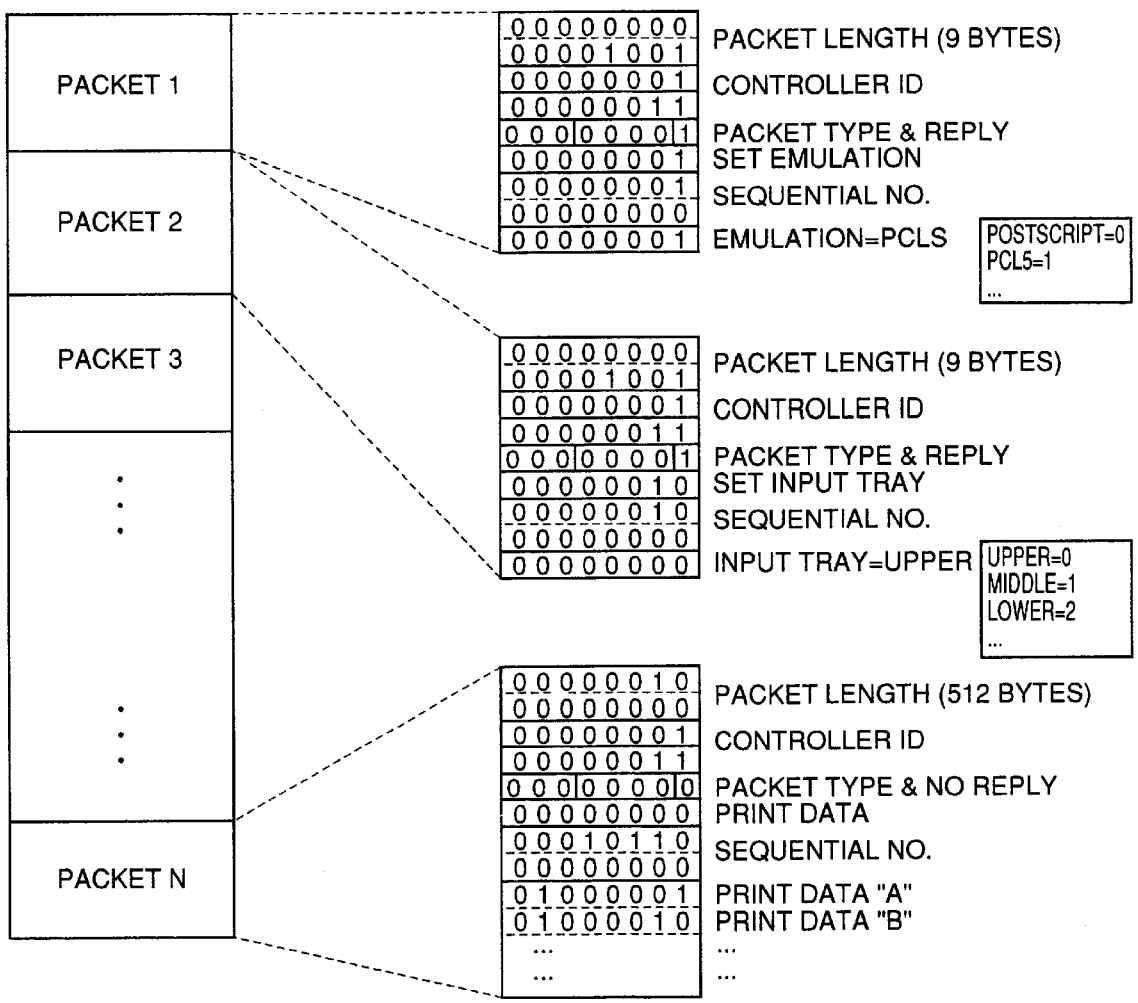
FIG. 3 is a diagram showing an example of a print job file which is transmitted from a host computer to the printer system.
Figure 4:
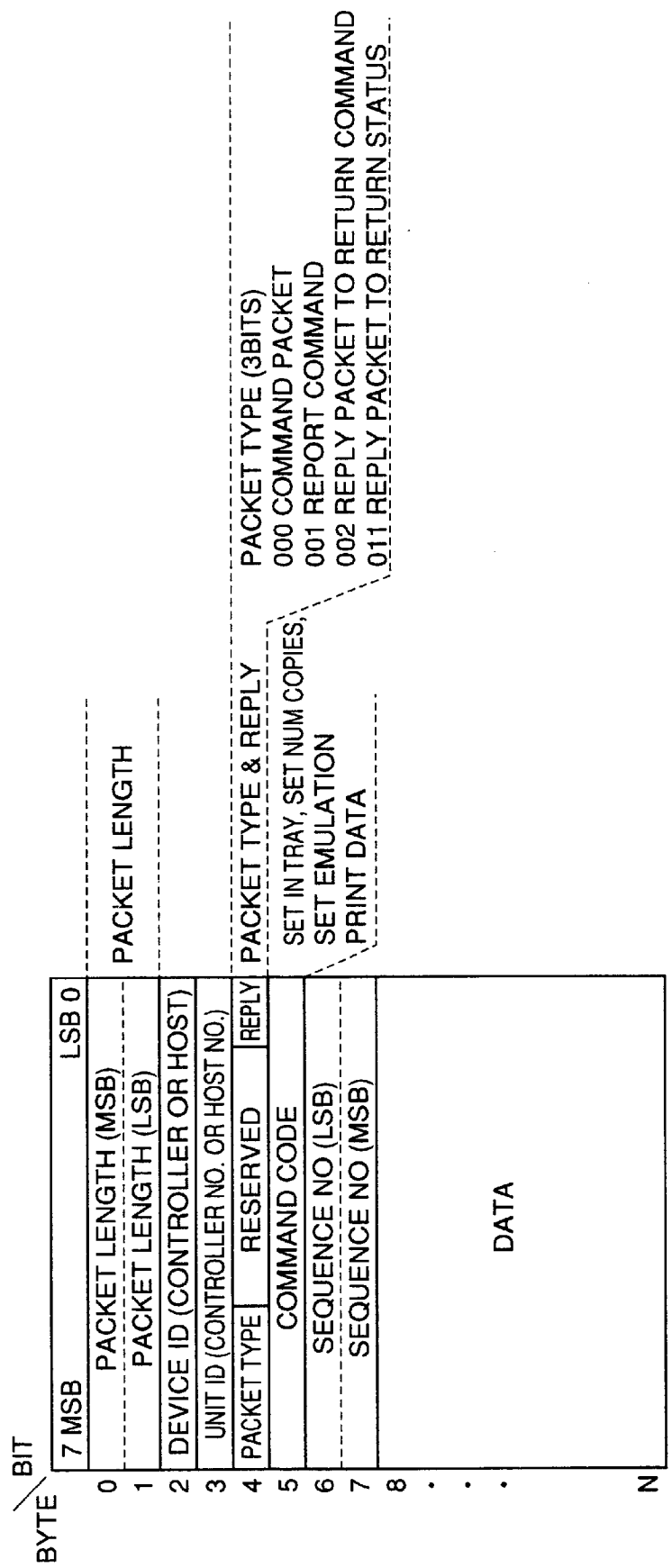
FIG. 4 is a diagram showing a format of one of a number of packets in the print job file in FIG. 3.

FIG. 3 shows an example of a print job file which is transmitted from one of the host computers to the printer system via the file server 4. As shown in FIG. 3, a print job file is comprised of "N" packets. There are two types of packets: a first packet type and a second packet type. The packets are classified into the two types depending on whether the contents at the 6th byte of each packet are equal to "00000000" or not. The former half of the packets "1" through "N" in one print job file are of the first type, and each of various print conditions for the print job file is defined by these packets. Each of the first-type packets contains 9 bytes of information. The latter half of the packets "1" through "N" in one print job file are of the second type, and these packets carry print data of the print job file to be printed. Each of the second-type packets contains 512 bytes of information.

Each of the packets in the print job file includes a packet length (the first and second bytes), a device identifier (the third byte), a unit identifier (the fourth byte), a packet type and reply (the fifth byte), a command code (the sixth byte), a sequential number (the seventh and eighth bytes), and data (the ninth and subsequent bytes). FIG. 4 shows a general format of one packet in a print job file. Generally, the 5th-byte packet type (3 bits) of the packet indicates one of four packet types, and the 6th-byte command code of the packet indicates one of various print conditions, as shown in FIG. 4.

As described above, various print conditions of a print job file are defined by the packets of the first type. The print conditions defined with respect to one print job file include: an emulation code, an input tray code, an output tray code, a paper size code, a download font code, a font selection code, a macro code, a bit-map font data code, an outline font data code, a number-of-copies code, a color print code, a resolution code, a print direction code, and so on.

In the case of the print job file in FIG. 3, the 6th-byte command code of the packet "1" indicates a set-emulationmode command, and the 9th-byte data of the packet "1" indicates an emulation code "PCL5". It is assumed, herein, that the printer system works in one of a number of operational emulation modes. For example, when the data of the packet "1" is equal to binary "0", it indicates an emulation code "PostScript", and when the data of the packet "1" is equal to binary "1", it indicates an emulation code "PCL5".

In the case of the print job file in FIG. 3, the command code of the packet "2" indicates a set-input-tray command, and the data of the packet "2" indicates that an upper input tray is to be selected. It is assumed, herein, that the print system is provided with three input trays: upper, middle, and lower input trays which are to supply sheets of recording paper with one of three different sizes. The packet "N" in FIG. 3 is of the second type, and the command code of the packet "N" indicates a print-data command, and the data of the packet "Z" is the print data which is to be printed by the printer system.

The print priority determining apparatus in this embodiment is realized by means of the CPU 10 and the operating system thereof. The CPU 10 reads a print condition of each of a plurality of print job files from the RAM 15, and reads a current setting parameter of the printer system from the RAM 15. The initial setting parameters of the printer system are stored in the RAM 15, and the initial setting parameters in the RAM 15 are replaced with any subsequent, up-to-date setting parameters. Also, some of the setting parameters of the print system are transmitted from the printer engine 2 to the print controller 1 via the engine I/F 16, and they are also stored in the RAM 15. The CPU 10 reads a current one of the setting parameters of the printer system from the RAM 15. The print job files in the file server 4 are transmitted to the print controller 1 via the server I/F and stored in the RAM 15, and the CPU 10 reads each of the print conditions of the print job files from the RAM 15, which conditions are defined by the first-type packets in the print job files.

The CPU 10 compares a print condition of the print job file with a setting parameter of the printer system, and detects whether or not the print condition is in accordance with the setting parameter with respect to each of the print conditions defined by the first-type packets of the print job file. Accordingly, the CPU 10 determines a priority of each of the print job files in accordance with a result of the above mentioned detection performed with respect to each of the print job files. Further, the CPU 10 enables the printer engine 2 to print out respective print data of the print job files in accordance with the determined priority.

Figure 5:
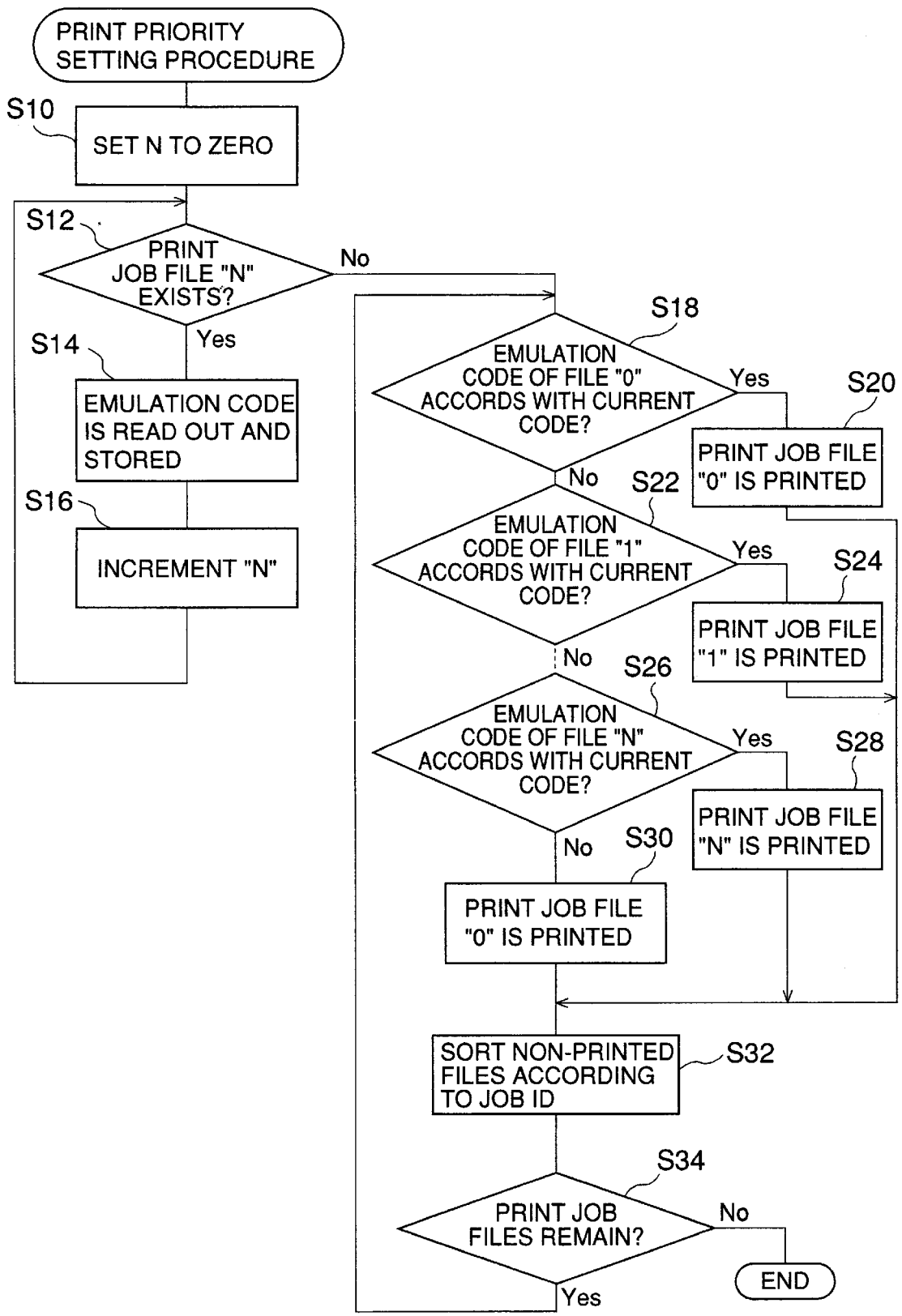
FIG. 5 is a flow chart for explaining a print priority setting procedure performed in an embodiment of the present invention.

Next, a description will be given of a print priority setting procedure performed in the above described embodiment of the present invention, with reference to FIG. 5. FIG. 5 shows a print priority setting procedure with respect to the emulation code which is performed by the CPU 10 of the print controller 1 in FIG. 1.

[Emulation Code]

The CPU 10 of the print controller 1 (or an operating system of the print controller 1) reads an emulation code of each of a plurality of print job files from the RAM 15. The emulation code of each print job file indicates one of a number of different emulation modes. The CPU 10 reads a current emulation code of the printer system from the RAM 15. The current emulation code is already stored in the RAM 15. It is necessary that each of the emulation modes is supported by the printer engine 2.

The CPU 10 compares the emulation code of each of the print job files with the current emulation code of the printer system, and detects whether or not the emulation code of each print job file is in accordance with the current emulation code of the printer system. The CPU 10 determines a priority of each of the print job files in accordance with a result of the above mentioned detection performed with respect to each of the print job files. Further, the CPU 10 enables the printer engine 2 to print out respective print data of the print job files in accordance with the determined priority.

In FIG. 5, steps S10 sets a print job file identifier "N" to zero (N=0). Step S12 detects whether or not there is any print job file in the RAM 15. If the result at the step S12 is affirmative, step S14 takes out an emulation code of the 1st packet of the print job file "N" from the RAM 15 and stores the emulation code in a given area of the RAM 15. Step S16 increments the print job file identifier "N" (N=N+1). After the step S16 is performed, the above steps S12 through S16 are repeated.

If the result at the step S12 is negative, step S18 detects whether or not the emulation code relating to the print job file "0" is in accordance with the current emulation code of the printer system. If the result at the step S18 is affirmative, step S20 carries out a printing procedure for print data of the second-type packets of the print job file "0".

On the other hand, if the result at the step S18 is negative, step S22 detects whether or not the emulation code relating to the print job file "1" is in accordance with the current emulation code of the printer system. If the result at the step S22 is affirmative, step S24 carries out a printing procedure for print data of the print job file "1". The same steps are performed for the emulation codes relating to the print job files "2" through "N", as in steps S26 and S28.

If the emulation code relating to the final print job file "N" is detected as not in accordance with the current emulation code of the printer system, step S30 carries out a printing procedure for the print data of the print job file "0".

Therefore, when the emulation code relating to each print job file is in accordance with the current emulation code of the printer system, the CPU 10 sets a higher priority to that print job file. When the emulation code relating to each print job file is not in accordance with the current emulation code of the printer system, the CPU 10 sets a lower priority to that print job file.

After the above step S30 is performed, or after any one of the steps S20, S24, . . . , S28 is performed, step S32 is performed. Step S32 sorts unprinted print job files according to the job file identifier in the RAM 15.

After the step S32 is performed, step S34 detects whether or not there are any unprinted print job files in the RAM 15. If the result at the step S34 is affirmative, the above steps S18 through S34 are repeated. On the other hand, if the result at the step S34 is negative, the above print priority setting procedure ends.

In addition, it is possible that an emulation change command (indicated by a kind of escape sequence command) within print data of a print job file is used instead. In such a case, it is necessary that the CPU 10 recognizes the emulation change command within the print data of a print job file.

Similarly to the above described print priority setting procedure relating to the emulation code, various print priority setting procedures relating to the other print conditions are also performed by the CPU 10 of the print controller 1 as in the following:

[Color Print Code]

The CPU 10 reads a color print code of each of the plurality of print job files from the RAM 15. The color print code of each print job file indicates one of a multi-color print mode and a monochrome print mode. The CPU 10 reads a current color print code of the printer system from the RAM 15. This information is already transmitted from the printer engine 2 to the RAM 15 via the engine I/F 16. It is necessary that the multi-color print mode and the monochrome print mode are supported by the printer engine 2.

The CPU 10 compares the color print code of each of the print job files with the current color print code of the printer system, and detects whether or not the color print code of each print job file is in accordance with the current color print code of the printer system. The CPU 10 determines a priority of each of the print job files in accordance with a result of the above mentioned detection performed with respect to each of the print job files.

As the time to print out a document in the multi-color print mode by the printer system is much longer than the time to print out a document in the monochrome print mode by the printer system, the CPU 10 sets a higher priority to a print job file when the color print code relating to that print job file indicates the monochrome print mode. In other words, the CPU 10 sets a lower priority to a print job file when the color print code relating to that print job file indicates the multi-color print mode.

[Resolution Code]

The CPU 10 reads a resolution code of each of the print job files from the RAM 15. The resolution code of each print job file indicates one of two or more different resolutions. The CPU 10 reads a current resolution code of the printer system from the RAM 15. The current resolution code is already transmitted from the printer engine 2 to the RAM 15 via the engine I/F 16. It is necessary that each of the resolutions is supported by the printer engine 2.

The CPU 10 compares the resolution code of each of the print job files with the current resolution code of the printer system, and detects whether or not the resolution code of each print job file is in accordance with the current resolution code of the printer system. The CPU 10 determines a priority of each of the print job files in accordance with a result of the above mentioned detection performed with respect to each of the print job files.

[Paper Size Code]

The CPU 10 reads a paper size code of each of the print job files from the RAM 15. The paper size code of each print job file indicates one of two or more different paper sizes. The CPU 10 reads a current paper size code of the printer system from the RAM 15. The current paper size code is already transmitted from the printer engine 2 to the RAM 15 via the engine I/F 16. It is necessary that each of the paper sizes is supported by the printer system.

The CPU 10 compares the paper size code of each of the print job files with the current paper size code of the printer system, and detects whether or not the paper size code of each print job file is in accordance with the current paper size code of the printer system. The CPU 10 determines a priority of each of the print job files in accordance with a result of the above mentioned detection performed with respect to each of the print job files. Further, the CPU 10 enables the printer engine 2 to print out respective print data of the print job files in accordance with the determined priority.

In addition, the CPU 10 reads a paper-end error code relating to the current paper size code of the printer system from the RAM 15. The paper-end error code is already transmitted from the printer engine 2 to the RAM 15. The CPU 10 at this time detects whether or not the paper size code of each print job file is in accordance with the current paper size code of the printer system. The CPU 10 sets a lower priority to a print job file when the paper size code of that print job file is in accordance with the current paper size code. As the current paper size with which the paper-end error has occurred is not used for printing for a while, the CPU 10 sets a higher priority to a print job file when the paper size code of that print job file is not in accordance with the current paper size code.

[Input Tray Code]

The CPU 10 reads an input tray code of each of the print job files from the RAM 15. The input tray code of each print job file indicates selected one of two or more input trays of the printer system relating to different paper sizes. It is necessary that the printer system is provided with those input trays. The CPU 10 reads a current input tray code of the printer system from the RAM 15. The current input tray code is already transmitted from the printer engine 2 to the RAM 15 via the engine I/F 16. A default value of the input tray code of the printer system is read from the NVRAM 13, and the CPU 10 checks that the read current input tray code is supported by the printer engine 2.

The CPU 10 compares the input tray code of each of the print job files with the current input tray code of the printer system, and detects whether or not the input tray code of each print job file is in accordance with the current input tray code of the printer system. The CPU 10 determines a priority of each of the print job files in accordance with a result of the above mentioned detection performed with respect to each of the print job files. More specifically, the CPU 10 sets a higher priority to a print job file when the input tray code of that print job file is in accordance with the current input tray code of the printer system, and sets a lower priority to the print job file when the input tray code of that print job file is not in accordance with the current input tray code.

[Output Tray Code]

The CPU 10 reads an output tray code of each of the print job files from the RAM 15. The output tray code of each print job file indicates selected one of two or more output trays of the printer system. It is necessary that the printer system is provided with those output trays. The CPU 10 reads a current output tray code of the printer system from the RAM 15. The current output tray code is already transmitted from the printer engine 2 to the RAM 15 via the engine I/F 16. A default value of the output tray code of the printer system is read from the NVRAM 13, and the CPU 10 checks that the current output tray code is supported by the printer engine 2.

The CPU 10 compares the output tray code of each of the print job files with the current output tray code of the printer system, and detects whether or not the output tray code of each print job file is in accordance with the current output tray code of the printer system. The CPU 10 determines a priority of each of the print job files in accordance with a result of the above mentioned detection performed with respect to each of the print job files. More specifically, the CPU 10 sets a higher priority to a print job file when the output tray code of that print job file is in accordance with the current output tray code of the printer system, and sets a lower priority to the print job file when the output tray code of that print job file is not in accordance with the current output tray code.

[Download Font Code]

The CPU 10 reads a download font code of each of the print job files from the RAM 15. The download font code indicates a selected download font of a print job file. Also, a download font identifier and a font size, relating to the selected download font, can be read. It is necessary that the selected download font of the print job file is supported by the printer engine 2. The CPU 10 reads a current download font code of the printer system from the RAM 15. The current download font code indicates that a corresponding download font is already transmitted from a host computer to the RAM 15 of the print controller 1. Also, a download font identifier and a font size, relating to the current download font code, can be read from a storage area of the RAM 15 which storage area is different from a storage area of the RAM 15 for the download font data.

The CPU 10 compares the download font code of each of the print job files with the current download font code of the printer system, and detects whether or not the download font code of each print job file is in accordance with the current download font code of the printer system. The CPU 10 determines a priority of each of the print job files in accordance with a result of the above mentioned detection performed with respect to each of the print job files. More specifically, the CPU 10 sets a higher priority to a print job file when the download font code of that print job file is in accordance with the current download font code of the printer system, and sets a lower priority to the print job file when the download font code of that print job file is not in accordance with the current download font code.

Generally, the transmission of download font data from a host computer to the print controller 1 and the storage of the download font data in a memory are time consuming. In order to efficiently carries out a plurality of print jobs, the CPU 10 deletes a download font code from a print job file in the RAM 15 when the download font code of that print job file is in accordance with the current download font code of the printer system. The download font data relating to the current download font code is already stored in the RAM 15, and it is not necessary to re-transmit the same font data to the print controller 1.

[Font Selection Code]

The CPU 10 reads a font selection code of each of the print job files from the RAM 15. The font selection code indicates a selected font of a print job file to print out it. It is necessary that the selected font of the print job file is supported by the printer engine 2. The CPU 10 reads a current font selection code of the printer system from the RAM 15. The current font selection code indicates that corresponding font data is already in the RAM 15. A font identifier, a font size and pitch, relating to the current font selection code, are previously stored in the font ROM 14, and they are transmitted from the font ROM 14 to the RAM 15.

The CPU 10 compares the font selection code of each of the print job files with the current font selection code of the printer system, and detects whether or not the font selection code of each print job file is in accordance with the current font selection code of the printer system. The CPU 10 determines a priority of each of the print job files in accordance with a result of the above mentioned detection performed with respect to each of the print job files. More specifically, the CPU 10 sets a higher priority to a print job file when the font selection code of that print job file is in accordance with the current font selection code of the printer system, and sets a lower priority to the print job file when the font selection code of that print job file is not in accordance with the current font selection code.

In addition, the font selection code indicates whether of outline font data and bit-map font data is selected to print out a document. It is necessary that the outline font data and the bit-map font data are supported by the printer system. A font identifier, a font size and pitch, relating to the current font selection code of the printer system, are previously stored in the font ROM 14, and they are transmitted from the font ROM 14 to the RAM 15. As the time to print out a document using the outline font data is much longer than the time to print out a document using the bit-map font data, the CPU 10 sets a lower priority to a print job file when the font selection code relating to that print job file indicates that the outline font data is selected.

[Print Direction Selection Code]

The CPU 10 reads a print direction selection code of each of the print job files from the RAM 15. The print direction selection code indicates which of a horizontal printing direction and a vertical printing direction is selected in order to print out a document. It is necessary that the horizontal and vertical printing directions are supported by the printer engine 2. The CPU 10 reads a current print direction selection code of the printer system from the RAM 15. The current print direction selection code indicates a selected print direction which is already set in the printer engine 2. The selected print direction is transmitted from the printer engine 2 to the RAM 15 of the print controller 1.

The CPU 10 compares the print direction selection code of each of the print job files with the current print direction selection code of the printer system, and detects whether or not the print direction selection code of each print job file is in accordance with the current print direction selection code of the printer system. The CPU 10 determines a priority of each of the print job files in accordance with a result of the above mentioned detection performed with respect to each of the print job files. More specifically, the CPU 10 sets a higher priority to a print job file when the print direction selection code of that print job file is in accordance with the current print direction selection code of the printer system, and sets a lower priority to the print job file when the print direction selection code of that print job file is not in accordance with the current print direction selection code.

[Macro Code]

The CPU 10 reads a macro code of each of the print job files from the RAM 15. The macro code indicates a macro code selected from among a number of stored macro codes used to print out a document. Also, a macro identifier and a command list, relating to the macro code, are read out. It is necessary that the macro code of a print job file is supported by the printer engine 2. The CPU 10 reads a current macro code of the printer system from the RAM 15. The current macro code indicates that a corresponding command list is already in the RAM 15.

The CPU 10 compares the macro code of each of the print job files with the current macro code of the printer system, and detects whether or not the macro code of each print job file is in accordance with the current macro code of the printer system. The CPU 10 determines a priority of each of the print job files in accordance with a result of the above mentioned detection performed with respect to each of the print job files. More specifically, the CPU 10 sets a higher priority to a print job file when the macro code of that print job file is in accordance with the current macro code of the printer system, and sets a lower priority to the print job file when the macro code of that print job file is not in accordance with the current macro code.

The switching of the current macro code of the printer system from one to another requires a certain time to be performed. In order to efficiently carry out a plurality of print jobs, the CPU 10 deletes a macro code from a print job file in the RAM 15 when the macro code relating to that print job file is in accordance with the current macro code of the printer system. The command list relating to the current macro code is already stored in the RAM 15. It is not necessary to re-store the same command list in the RAM 15 when the macro code of a print job file is in accordance with the current macro code.

[Number-of-Copies Code]

The CPU 10 reads a number-of-copies code of each of the print job files from the RAM 15. The number-of-copies code indicates that the selected number of copies for a document is requested to be printed out. It is necessary that a multi-copy function is supported by the printer engine 2. The CPU 10 reads a current number-of-copies code of the printer system from the RAM 15. The current number-of-copies code indicates that the number of copies is already stored in the RAM 15 as the setting parameter. A default value of the number-of-copies code of the printer system is read from the NVRAM 13 and stored in the RAM 15.

The CPU 10 compares the number-of-copies code of each of the print job files with the current number-of-copies code of the printer system, and detects whether or not the number-of-copies code of each print job file is in accordance with the current number-of-copies code of the printer system. As the time to print out a document with a greater number of copies is longer than the time to print out a document with a smaller number, the CPU 10 sets a lower priority to a print job file when the number-of-copies code relating to that print job file is greater than the current number-of-copies code of the printer system.

[Image Data Code]

The CPU 10 reads an image data code from any of the print job files in the RAM 15 when a print job file contains image data to be printed. It is necessary that an image data printing function is supported by the printer engine 2. As the time to print out a document with image data is much longer than the time to print out a document without image data (which includes character data only), the CPU 10 sets a lower priority to the print job file when an image data code is read from that print job file in the RAM 15.

[Dual-Print Code]

The CPU 10 reads a dual-print code from any of the print job files in the RAM 15 when a print job file contains a dual-print code therein. The dual-print code indicates that the printer system is requested to be operated in a dual-print mode to print a document on both sides of a recording sheet. It is necessary that a dual-print function is supported by the printer engine 2. The CPU 10 reads a current dual-print code of the printer system from the RAM 15. The current dual-print code indicates that the dual-print function is already stored in the RAM 15 as the setting parameter supported by the printer engine 2.

As the time to print out a document in the dual-print mode is much longer than the time to print out a document in the normal, single-print mode, the CPU 10 sets a lower priority to the print job file when a dual-print code is read from that print job file in the RAM 15.

[Graphics Command Code]

The CPU 10 reads a graphics command code from any of the print job files in the RAM 15 when a print job file contains a graphics command code therein. The graphics command code indicates that the printer system is requested to print graphics data, such as a circle, as well as character data on a recording sheet. It is necessary that a graphics command function is supported by the printer engine 2. As the time to print out a document with a graphics command code is much longer than the time to print out a document without graphics command code (which includes character data only), the CPU 10 sets a lower priority to the print job file when a graphics command code is read from that print job file in the RAM 15.

[Compressed Data Code]

The CPU 10 reads a compressed data code from any of the print job files in the RAM 15 when a print job file contains a compressed data code therein. The compressed data code indicates that the printer system is requested to print compressed data, such as compressed character data and compressed image data on a recording sheet. It is necessary that a function to print compressed data is supported by the printer engine 2. As the time to print out a document with a compressed data code is shorter than the time to print out a document without compressed data code (which includes the normal, non-compressed data only), the CPU 10 sets a higher priority to the print job file when a compressed data code is read from that print job file in the RAM 15.

Next, a description will be given of a print priority determining apparatus in another embodiment of the present invention. The print priority determining apparatus in this embodiment is realized by means of the CPU 10 of the printer system in FIG. 1 and the operating system thereof.

The CPU 10 reads a plurality of print conditions of each of a plurality of print job files from the RAM 15, and reads from the RAM 15 a plurality of current setting parameters of the printer system, which correspond to the respective print conditions. The initial setting parameters of the printer system are stored in the RAM 15, and the initial setting parameters in the RAM 15 are replaced with any subsequent, up-to-date setting parameters. The CPU 10 reads the current setting parameters of the printer system from the RAM 15. The print job files in the file server 4 are transmitted to the print controller 1 via the server I/F and stored in the RAM 15, and the CPU 10 reads each of the print conditions of the print job files from the RAM 15, the conditions being defined by the first-type packets of the print job files.

The CPU 10 compares each of the print conditions of each print job file with the corresponding setting parameter of the printer system, and detects whether or not each print condition is in accordance with a corresponding setting parameter with respect to each of the print conditions defined by the first-type packets of one print job file. The CPU 10 determines a priority of each of the print job files by totaling a number of print conditions of each print job file which are in accordance with corresponding setting conditions of the printer system. In other words, the greater the number of the print conditions which are in accordance with the corresponding setting conditions is, the higher the print priority of the print job file is. The CPU 10 arranges a sequence of the print job files being printed, in accordance with the determined priority of each print job file. Further, the CPU 10 enables the printer engine 2 to print out respective print data of the print job files in the arranged sequence of the print job files.

The CPU 10 in the above mentioned embodiment arranges the sequence of the print job files in accordance with the determined priority only when a file sequence sorting mode of the print priority determining apparatus is turned on. The CPU 10 does not arrange the sequence of the print job files in the above manner when the file sequence sorting mode of the print priority determining apparatus is turned off. Therefore, when it is not necessary to use a file sequence sorting mode, the file sequence sorting mode of the print priority determining apparatus is turned off, and the printer system carries out the printing of the print job files in a sequence of the print job files which makes no account of the setting conditions of the printer system.

Further, the present invention is not limited to the above described embodiments, and variations and modifications may be made without departing from the scope of the present invention.

What is claimed is:

1. A printing process in which a printer determines which of several print jobs in a queue to print next based on comparing current printer setting parameters with printer setting parameters specified by the respective print jobs in the queue rather than solely based on the order in which the printer received the print jobs, comprising the steps of:

a. providing a printer;

b. storing current printer setting parameters at said printer, said current printer setting parameters stored at the printer indicating at least one of a plurality of emulation modes for the printer and one of a plurality of resolutions for the printer;

c. receiving at said printer print jobs each including information specifying respective printer setting parameters for the print job;

d. storing the print jobs received in said receiving step as a queue of print jobs stored at the printer;

e. comparing said current printer setting parameters stored at said printer with the printer setting parameters of the print jobs in said queue stored at the printer;

f. selecting the print job that will be printed next by the printer from among the print jobs in the queue stored at the printer depending on results of said comparing step; wherein the print job that will be printed next includes printer setting parameters matching more current printer setting parameters than other print jobs stored at said printer.

g. if the printer setting parameters of the print job selected for printing next in said selecting step differ from said current printer setting parameters, automatically replacing the current printer setting parameters stored at said printer with the printer setting parameters of the selected print job;

h. repeating steps c. through g. for print jobs remaining in the queue; and i. printing print jobs selected in said selecting step using said printer.

2. A printing process as in claim 1 in which the printer setting parameters comprise an emulation code.

3. A printing process as in claim 1 in which the printer setting parameters comprise a color print code.

4. A printing process as in claim 1 in which the printer setting parameters comprise a resolution code.

5. A printing process as in claim 1 in which the printer setting parameters comprise a paper size code.

6. A printing process as in claim 1 in which the printer setting parameters comprise an input tray code.

7. A printing process as in claim 1 in which the printer setting parameters comprise an output tray code.

8. A printing process as in claim 1 in which the printer setting parameters comprise a download font code.

9. A printing process as in claim 1 in which the printer setting parameters comprise a font selection code.

10. A printing process as in claim 1 in which the printer setting parameters comprise bit-map font data and outline font data.

11. A printing process as in claim 1 in which the printer setting parameters comprise a print direction selection code.

12. A printing process as in claim 1 in which the printer setting parameters comprise a macro code.

13. A printing process as in claim 1 in which the printer setting parameters comprise a number-of-copies code.

14. A printing process as in claim 1 in which the printer setting parameters comprise an image data code.

15. A printing process as in claim 1 in which the printer setting parameters comprise a dial-print code.

16. A printing process as in claim 1 in which the printer setting parameters comprise a graphics command code.

17. A printing process as in claim 1 in which the printer setting parameters comprise a compressed data code.

18. A printing method comprising the steps of:

a. providing a printer and storing therein a plurality of current printer setting parameters for the printer, said current printer setting parameters stored at the printer indicating at least one of a plurality of emulation modes for the printer and one of a plurality of resolutions for the printer;

b. storing a queue of print jobs for said printer, each print job including a plurality of respective print conditions for the print job;

c. comparing each of a number of the current print conditions with corresponding printer setting parameters included in each of the print jobs in the stored queue;

d. setting a printing priority for the print jobs in the queue depending on results from said comparing step for a number of current printer setting parameters compared with corresponding printer setting parameters included in the print job in the queue; wherein a print job including printer setting parameters matching more current printer setting parameters than other print jobs in the queue is set to a highest printing priority;

e. if the printer setting parameters of the print job selected for printing next differ from said current printer setting parameters, automatically changing the current printer setting parameters to those of the selected print job; and f. repeating steps c. through e. for print jobs remaining in the queue.

19. A printer that determines which of several print jobs in a queue to print next based on comparing a number of current printer setting parameters with corresponding printer setting parameters specified by the respective print jobs in the queue rather than solely based on the order in which the printer received the print jobs, comprising:

a. memory at the printer for storing:

i. current printer setting parameters, said current printer setting parameters stored at the printer indicating at least one of a plurality of emulation modes for the printer and one of a plurality of resolutions for the printer; and ii. a queue of print jobs received by the printer, each print job including information specifying respective printer setting parameters for that print job;

b. an electronic controller configured to compare said current printer setting parameters with the printer setting parameters included in the print jobs in said queue stored in the memory at the printer and to select the print job that will be printed next from among the print jobs in the queue depending on results of said comparing; wherein the print job that will be printed next includes printer setting parameters matching more current printer setting parameters than the print jobs in the queue; and c. said electronic controller further being configured to automatically change the current printer setting parameters to those of the print job selected for printing next in case they differ from said current printer setting parameters each time another print job from said queue is selected for printing next and thereafter repeat said comparing to select the next print job from among print jobs remaining in said queue.

* * * * *